United States Patent
Tahara et al.

(10) Patent No.: US 8,423,227 B2
(45) Date of Patent: Apr. 16, 2013

(54) MONITORING APPARATUS AND METHOD

(75) Inventors: Tatsuya Tahara, Toyota (JP); Shunsuke Kondo, Fukuroi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1325 days.

(21) Appl. No.: 12/039,957

(22) Filed: Feb. 29, 2008

(65) Prior Publication Data

US 2008/0215293 A1 Sep. 4, 2008

(30) Foreign Application Priority Data

Mar. 1, 2007 (JP) ................................ 2007-051563

(51) Int. Cl.
*G01M 17/00* (2006.01)
(52) U.S. Cl.
USPC .................. 701/29.1; 73/114.63; 123/406.13; 123/406.44; 123/406.55
(58) Field of Classification Search .................. 123/295, 123/304, 431, 406.13, 406.44, 406.55; 701/29, 701/68, 29.1; 702/183; 73/114.63
See application file for complete search history.

(56) References Cited

U.S. PATENT DOCUMENTS

| | | | | |
|---|---|---|---|---|
| 3,759,231 A | * | 9/1973 | Endo | 123/492 |
| 4,335,696 A | * | 6/1982 | Schnurle et al. | 123/492 |
| 4,792,902 A | * | 12/1988 | Hrovat et al. | 701/105 |
| 5,601,172 A | * | 2/1997 | Kale et al. | 192/85.63 |
| 2002/0128116 A1 | * | 9/2002 | Idogawa et al. | 477/54 |
| 2005/0081513 A1 | | 4/2005 | Katayama | |
| 2006/0207558 A1 | * | 9/2006 | Tahara | 123/431 |
| 2006/0207559 A1 | * | 9/2006 | Kinose et al. | 123/431 |
| 2007/0017483 A1 | * | 1/2007 | Tahara et al. | 123/431 |
| 2008/0208404 A1 | * | 8/2008 | Tahara et al. | 701/29 |

FOREIGN PATENT DOCUMENTS

| | | | |
|---|---|---|---|
| JP | 10-184421 A | | 7/1998 |
| JP | 2000-205011 A | | 7/2000 |
| JP | 2000205011 A | * | 7/2000 |
| JP | 2001-132526 A | | 5/2001 |
| JP | 2005-120933 A | | 5/2005 |

* cited by examiner

*Primary Examiner* — Khoi Tran
*Assistant Examiner* — Stephen Holwerda
(74) *Attorney, Agent, or Firm* — Sughrue Mion, PLLC

(57) ABSTRACT

An accumulating portion suspends the accumulation of an airflow meter output and a timer suspends the time count when a clutch semi-engagement detection signal is being output from a clutch semi-engagement detection portion. Thus, the airflow meter output obtained while the clutch semi-engagement detection signal was being output is excluded from the calculation of a total intake air amount. A comparing portion compares the calculated total intake air amount with a reference value obtained from a reference value setting portion. If the total intake air amount is smaller than the reference value, the Cold Start Strategy (CSS) control is determined as being abnormal and a CSS-abnormality signal is output.

14 Claims, 13 Drawing Sheets

1(1A, 1B)

MONITORING APPARATUS AND METHOD

INCORPORATION BY REFERENCE

The disclosure of Japanese Patent Application No. 2007-051563 filed on Mar. 1, 2007 including the specification, drawings and abstract is incorporated herein by reference in its entirety.

BACKGROUND OF THE INVENTION

1. Field of the Invention

The invention relates to monitoring apparatuses for monitoring the operation state of an internal combustion engine, and particularly to such monitoring apparatuses for vehicles in which a frictional coupling device is provided on the drive power transmission path from the internal combustion engine to the drive wheels of the vehicle.

2. Description of the Related Art

In recent years, various measures have been taken to reduce the environmental stress due to emissions of motor vehicles. As one of such measures, environment-oriented internal combustion engines have been developed which reduce the emissions by optimizing the throttle opening degree, the ignition timing, the fuel injection timing, the fuel injection amount, the operation timing of intake and exhaust valves, and so on, under various conditions.

Such optimization control by environment-oriented internal combustion engines uses a particular control logic when the internal combustion engine has been started at a lower temperature. Because an internal combustion engine runs by combusting fuel, the temperature of the internal combustion engine becomes high as it continues to run. Therefore, typically, internal combustion engines are designed such that an optimum combustion state is accomplished at a certain high temperature. Meanwhile, in the case where the internal combustion engine has been started after it was stopped for a long period of time, the temperature of the internal combustion engine remains low for a while after the engine start, and in such a state, a desired combustion state may not be accomplished. To cope with this, the aforementioned cold-engine control logic is used to optimize fuel combustion in a cold condition immediately after the engine start.

The exhaust substances that are emitted from an internal combustion engine in a cold condition immediately after the engine start are called "cold-start emissions", and the engine control for reducing such cold-start emissions is called "CSS (Cold Start Strategy) control".

Some of the motor vehicles incorporating an internal combustion engine enabling such CSS control are provided with a monitoring apparatus for monitoring the state of the CSS control, and such a monitoring apparatus is called "CSS monitor" and used to monitor whether the CSS control is being or has been properly executed. More specifically, the CSS monitor ascertains the presence of an abnormality in the operation state of the internal combustion engine based on, for example, the amount of intake air to the internal combustion engine or based on the state of the ignition timing (advanced or retarded).

In vehicles having a manual transmission provided on the drive power path from the internal combustion engine to the drive wheels, a frictional coupling device (clutch device) is provided to allow and interrupt the transmission of the drive power, and the amount of engagement of the frictional coupling device changes as it is operated by the driver. When the driver operates the clutch device at the time of for example, starting the vehicle from a standstill, it causes a relatively large change in the load on the internal combustion engine and the friction (frictional resistance) of the internal combustion engine increases, causing an external disturbance to the combustion of the internal combustion engine.

In view of such influence of the clutch operation by the driver, for example, Japanese Patent Application Publication No. 2000-205011 (JP-A-2000-205011) describes a control apparatus for an internal combustion engine of a vehicle with a manual transmission. This control apparatus prevents making an erroneous determination on the combustion state by suspending the combustion state determination process when the clutch is determined to have been engaged.

However, this control apparatus simply suspends the combustion state determination process when the clutch is determined to have been engaged, that is, JP-A-2000-205011 does not disclose any structure enabling the combustion state determination process to be continued even if the clutch is being operated.

In general, a CSS monitor ascertains the presence of an abnormality of the internal combustion engine at a low temperature and normally performs the ascertainment process only one time after the engine start. Therefore, a sufficient monitoring performance can not be achieved by simply suspending the ascertainment process when a clutch operation is detected. Note that other related technology is described in Japanese Patent Application Publication No. 10-184421 (JP-A-10-184421).

SUMMARY OF THE INVENTION

The invention provides monitoring apparatuses that enable the operation state of an internal combustion engine to be continuously monitored even if a clutch is being operated.

An aspect of the invention relates to a monitoring apparatus for monitoring the operation state of an internal combustion engine of a vehicle having a frictional coupling device that allows or interrupts transmission of drive power from the internal combustion engine to drive wheels of the vehicle, the frictional coupling device being adapted to change the amount of engagement as the frictional coupling device is operated by a driver. This monitoring apparatus has: a total air amount calculation portion that calculates a total air amount by accumulating the flow rate of air drawn into the internal combustion engine for a predetermined monitoring period; an abnormality determination portion that determines the operation state of the internal combustion engine as being abnormal when the calculated total air amount is smaller than the reference value; and a detecting portion that detects a semi-engaged state of the frictional coupling device. The total air amount calculation portion suspends the flow rate accumulation when the detecting portion is detecting the semi-engaged state of the frictional coupling device.

According to the monitoring apparatus described above, when the total air amount calculated by accumulating the flow rate of air drawn into the internal combustion engine is smaller than the reference value, the operation state of the internal combustion engine is determined as being abnormal. Further, when the semi-engaged state of the frictional coupling device is being detected, the accumulation of the flow rate of air drawn into the internal combustion engine is suspended, and thus the flow rate of air drawn into the internal combustion engine when the semi-engaged state of the frictional coupling device is being detected is excluded from the calculation of the total air amount.

As such, the operation state of the internal combustion engine can be monitored in a reliable manner without making an erroneous determination even if the frictional coupling device is being operated by the driver.

Another aspect of the invention relates to a monitoring apparatus for monitoring the operation state of an internal combustion engine of a vehicle having a frictional coupling device that allows or interrupts transmission of drive power from the internal combustion engine to drive wheels of the vehicle, the frictional coupling device being adapted to change the amount of engagement as the frictional coupling device is operated by a driver. This monitoring apparatus has: a total air amount calculation portion that calculates a total air amount by accumulating the flow rate of air drawn into the internal combustion engine for a predetermined monitoring period; an abnormality determination portion that determines the operation state of the internal combustion engine as being abnormal when the calculated total air amount is smaller than the reference value; and a detecting portion that detects a semi-engaged state of the frictional coupling device. The reference value is changed to a smaller value when the detecting portion detects the semi-engaged state of the frictional coupling device.

According to the monitoring apparatus described above, when the total air amount calculated by accumulating the flow rate of air drawn into the internal combustion engine is smaller than the reference value, the operation state of the internal combustion engine is detected as being abnormal. Further, when the semi-engaged state of the frictional coupling device is detected, the reference value is set to a smaller value, that is, the reference value is reduced as the flow rate of air drawn into the internal combustion engine decreases as a result of the frictional coupling device having been placed in the semi-engaged state.

As such, the operation state of the internal combustion engine can be monitored in a reliable manner without making an erroneous determination even if the frictional coupling device is being operated by the driver.

The above-described monitoring apparatuses may be such that the reference value is set according to at least one of the atmospheric pressure and the temperature of coolant of the internal combustion engine.

Further, the above-described monitoring apparatuses may be such that the total air amount calculation portion starts the accumulation of the flow rate of air drawn into the internal combustion engine from the start of the internal combustion engine.

Further, the above-described monitoring apparatuses may be such that the internal combustion engine runs by combusting gasoline. Further, the above-described monitoring apparatuses may be such that the vehicle has an operation mechanism having a movable portion that is driven to change the amount of engagement of the frictional coupling device and the detecting portion detects the semi-engaged state of the frictional coupling device based on the travel of the movable portion of the operation mechanism.

Another aspect of the invention relates to a method for monitoring the operation state of an internal combustion engine of a vehicle having a frictional coupling device that allows or interrupts transmission of drive power from the internal combustion engine to drive wheels of the vehicle, the frictional coupling device being adapted to change the amount of engagement as the frictional coupling device is operated by a driver, the method including: monitoring a state value indicating the operation state of the internal combustion engine for a predetermined monitoring period; detecting a semi-engaged state of the frictional coupling device; and suspending the monitoring when the semi-engaged state of the frictional coupling device is being detected and continuing the monitoring until a total monitoring time excluding the time during which the monitoring is suspended becomes equal to the predetermined monitoring period.

As such, the monitoring apparatuses and methods of the invention enable the operation state of the internal combustion engine to be continuously monitored even if the frictional coupling device is being operated.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein.

DETAILED DESCRIPTION OF THE EMBODIMENTS

Figure 1:
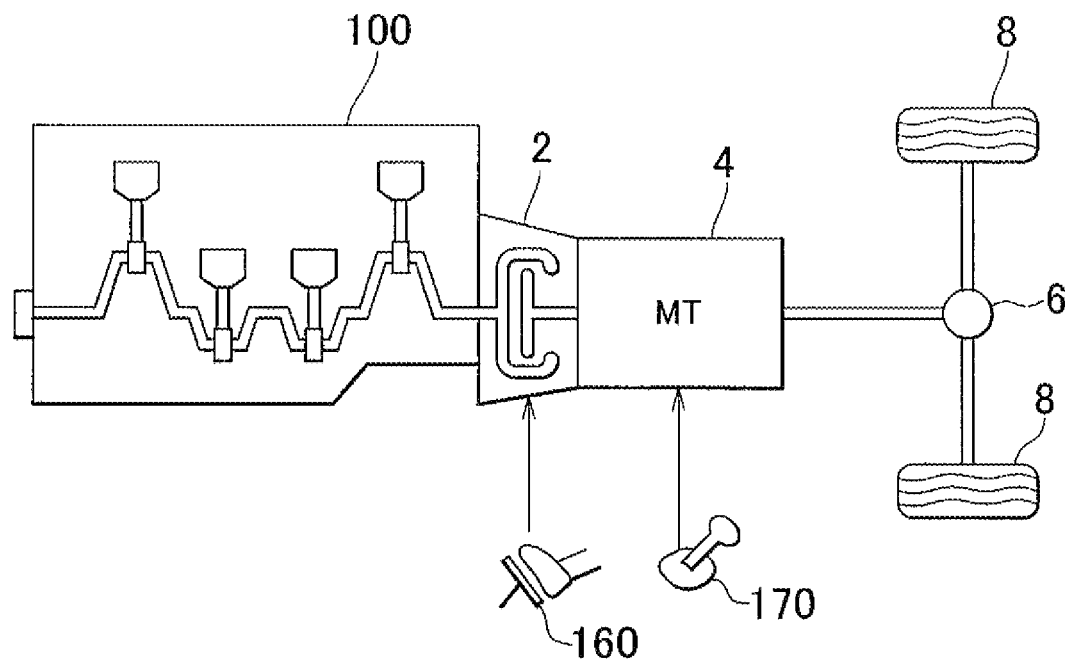
FIG. 1 is a view schematically showing the configuration of a vehicle monitored by a monitoring apparatus according to the first example embodiment of the invention.

Example embodiments of the invention will be described in detail with reference to the drawings. Note that like elements and components will be denoted by like reference numerals and their descriptions will not be repeated.

First Example Embodiment

Overall Configuration of Vehicle

FIG. 1 is a view schematically showing the configuration of a vehicle 1 monitored by a monitoring apparatus according to the first example embodiment of the invention.

Referring to FIG. 1, the vehicle 1 runs on the drive power produced by a gasoline internal combustion engine (will be referred to as "engine") 100 through combustion of gasoline and then transmitted to drive wheels 8. On the drive power transmission path from the engine 100 to the drive wheels 8 are provided a frictional coupling device (will be referred to as "clutch device") 2, a manual transmission (MT) 4, and a differential 6.

The clutch device 2 is coupled with the output shaft (crankshaft) of the engine 100 and is operable to allow or interrupt the transmission of driver power from the engine 100 to the drive wheels 8 as needed. More specifically, as the driver operates (steps down) a clutch pedal 160, which constitutes an operation mechanism, at least one of the clutch plate on the engine 100 side and the clutch plate on the manual transmission 4 side moves, whereby the amount of engagement between the two clutch plates changes accordingly. As the clutch plates, which are movable portions, are thus operated, the magnitude of the drive power transmitted from the engine 100 to the drive wheels 8 changes. When the travel of the clutch pedal 160 stepped down by the driver exceeds a particular amount, the amount of engagement of the clutch device 2 becomes substantially zero, interrupting the power transmission path from the engine 100 to the drive wheels 8.

The manual transmissions is a shift mechanism that changes the speed ratio of the drive power transmitted from the engine 100 to the drive wheels 8 by changing the combination of gears as the driver operates a shift lever 170. The differential 6 serves as a power distribution mechanism that distributes the driver power output from the manual transmission 4 to the respective drive wheels 8.

Note that the vehicle 1 may alternatively be a hybrid vehicle having a motor as well as the engine 100.

Figure 2:
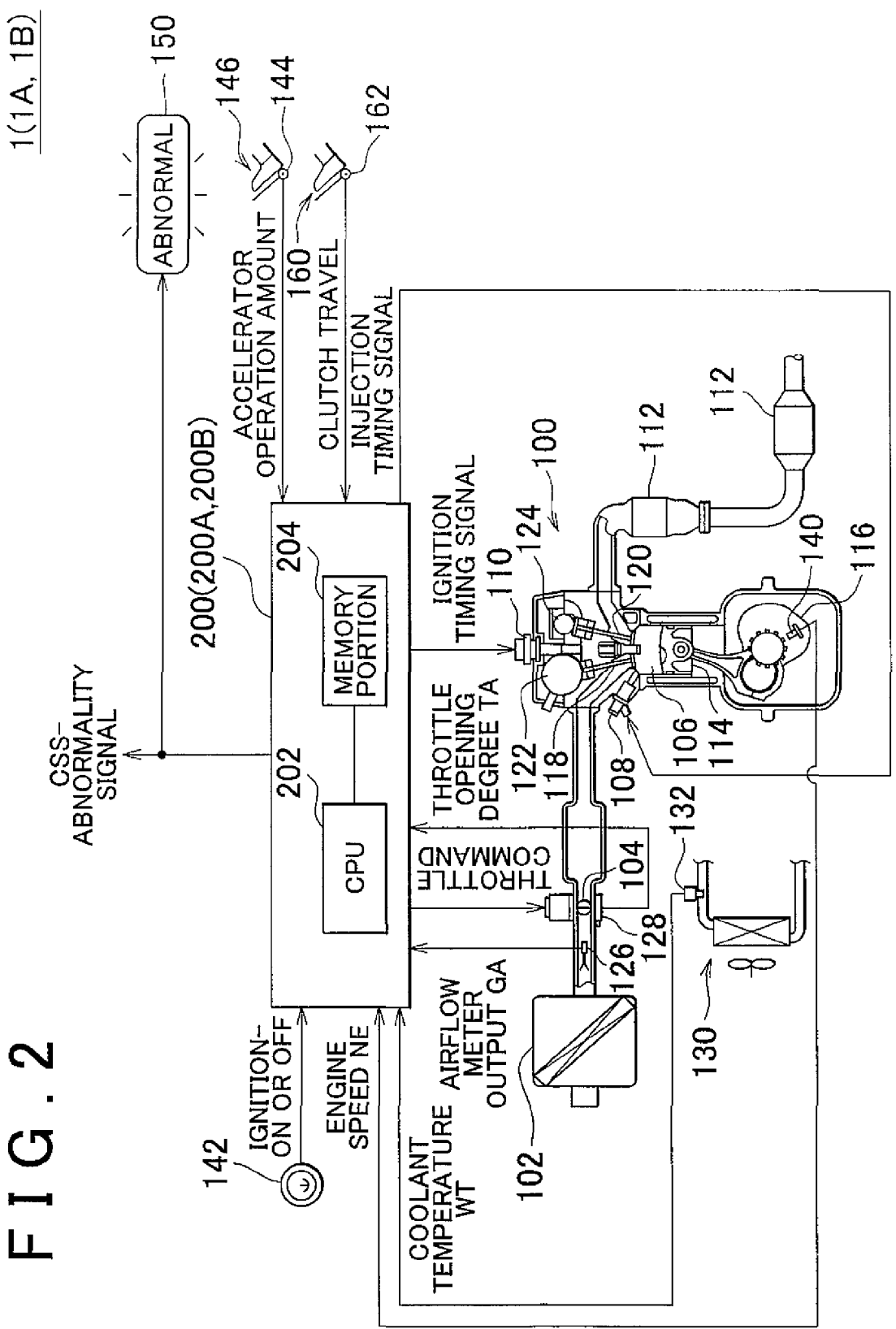
FIG. 2 is a view schematically showing the configuration of a main portion of the vehicle incorporating the monitoring apparatus according to the first example embodiment of the invention.

FIG. 2 is a view schematically showing the configuration of a main portion of the vehicle 1 incorporating the monitoring apparatus according to the first example embodiment of the invention.

Referring to the FIG. 2, the monitoring apparatus is constituted of a control apparatus 200 that executes various programs.

Air is drawn into the engine 100 via an air cleaner 102. The flow rate of air drawn into the engine 100 is adjusted by a throttle mechanism 104. The throttle mechanism 104 is, for example, an electrically-controlled throttle valve that is driven by a motor according to throttle commands from the control apparatus 200.

The control apparatus 200 issues the throttle commands in accordance with the amount the driver is stepping down an accelerator pedal 146 (accelerator operation amount), which is detected by an accelerator operation amount sensor 144. A throttle sensor 128 is provided to detect the degree of opening of the throttle valve of the throttle mechanism 104 (throttle opening degree TA). Further, a flow meter 126 is provided in a passage between the air cleaner 102 and the throttle mechanism 104 to detect the flow rate of air drawn into the engine 100 (airflow meter output GA).

The air drawn into the engine 100 is delivered to each cylinder 106 (combustion chamber) and mixed with the fuel injected from an injector 108. For example, the injection nozzle of each injector 108 is provided in the cylinder 106, and fuel is directly injected into the cylinder 106 from the intake side of the cylinder 106 (the side to which air is supplied). The injection timing of each injector 108 is controlled by injection timing signals from the control apparatus 200. While FIG. 2 shows, as an example of the engine 100, a direct injection engine in which the injection nozzles of the injectors 108 are provided in the respective cylinders 106, the engine 100 may alternatively be a port-injection type engine having injectors provided in the intake ports.

In each cylinder 106, an air-fuel mixture is ignited by an ignition plug 110 (igniter) and combusted. The ignition timing of each ignition plug 110 is controlled by ignition timing signals from the control apparatus 200. The air-fuel mixture that has been ignited by the ignition plug 110 and combusted, that is, exhaust gas is purified by a three-way catalyst 112 and then discharged to the outside of the vehicle.

Combustion of an air-fuel mixture pushes a piston 114 down, whereby a crankshaft 116 (output shaft) rotates. A crank angle sensor 140 detects the rotation speed of the crankshaft 116 (engine speed NE).

An intake valve 118 and an exhaust valve 120 are provided at the upper end of each cylinder 106. The intake valve 118 is used to control the amount of air introduced into the cylinder 106 and the timing of the air introduction. The exhaust valve 120 is used to control the amount of gas discharged from the cylinder 106 and the timing of the gas discharge. The intake valves 118 are driven by cams 122 and the exhaust valves 120 are driven by cams 124.

An engine coolant passage (not shown in the drawings) is formed throughout the engine 100 and the heat of the engine 100 is radiated (cooled) via a radiator 130. A coolant sensor 132 is provided in the engine coolant passage to detect the temperature of the engine coolant (coolant temperature WT).

The control apparatus 200 is, for example, an ECU (Electronic Control Unit) constituted of a CPU (Central Processing Unit) 202 and a memory portion 204 including a RAM (Random Access Memory), a ROM (Read Only Memory), etc. The control apparatus 200 controls the throttle opening degree, the ignition timing, the fuel injection timing, the fuel injection amount, the operation timing of the intake and exhaust valves, and so on, so as to achieve a desired operation state of the engine 100 based on the signals input from various sensors, which will be described later, and various maps and programs stored in the memory portion 204.

In particular, in this example embodiment, the control apparatus 200 is adapted to determine the state of the engine 100 (i.e., whether the temperature of the engine 100 is low or high) based on the coolant temperature WT at the time of cranking the engine 100 using a starter (not shown in the drawings) in response to an ignition-ON signal that is output from an ignition switch 142 when it is operated by the driver. At this time, if the temperature of the engine 100 is low, the control apparatus 200 executes a particular control procedure for reducing the engine emissions that are produced when the engine 100 is running at a low temperature (cold-start emissions). This control procedure will be referred to as "CSS control".

The control apparatus 200 accumulates the amount of air drawn into the engine 100 for a predetermined period of time (e.g., 20 seconds) after the start of the engine 100 based on the airflow rate detected by the flow meter 126 (airflow meter output GA). After the predetermined period of time has passed, the control apparatus 200 then compares the accumulated air amount with a reference value. If the accumulated air amount is smaller than the reference value, the control apparatus 200 determines the CSS control of the engine 100 as being abnormal, and then turns on a warning light 150 or makes it blink to indicate the abnormality to the driver while outputting a diagnosis code indicative of the abnormality (CSS-abnormality signal).

A clutch travel sensor 162 detects the travel of the clutch pedal 160, that is, the amount the clutch pedal 160 is being stepped down by the driver, and the clutch travel sensor 162 inputs the detected travel of the clutch pedal 160 to the control apparatus 200.

Functional Configuration of Control Apparatus

Figure 3:
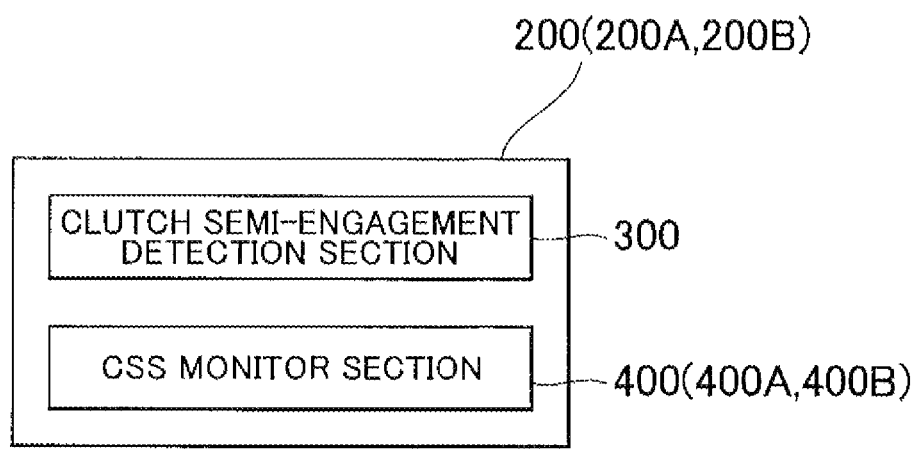
FIG. 3 is a block diagram illustrating the outline of the functional configuration of a control apparatus of the first example embodiment of the invention.

FIG. 3 is a block diagram illustrating the outline of the functional configuration of the control apparatus 200 of the first example embodiment.

Referring to FIG. 3, the control apparatus 200 has, as its functional sections, a clutch semi-engagement detection section 300 and a CSS monitor section 400. The clutch semi-engagement detection section 300 detects whether the clutch device 2 is in a semi-engaged state. The "semi-engaged state" refers to an intermediate state between where the clutch device 2 is fully released (i.e., the state where substantially no drive power is being transmitted) and where the clutch device 2 is fully engaged (i.e., the state where the drive power input to the clutch device 2 is substantially fully transmitted therefrom within the capacity of the clutch device 2).

Various methods can be used to detect whether the clutch device 2 is presently in a semi-engaged state. In this example embodiment, the clutch semi-engagement detection section 300 detects whether the clutch device 2 is presently in a semi-engaged state based on the travel of the clutch pedal 160 (i.e., the amount the clutch pedal 160 is being stepped down).

Figure 4:
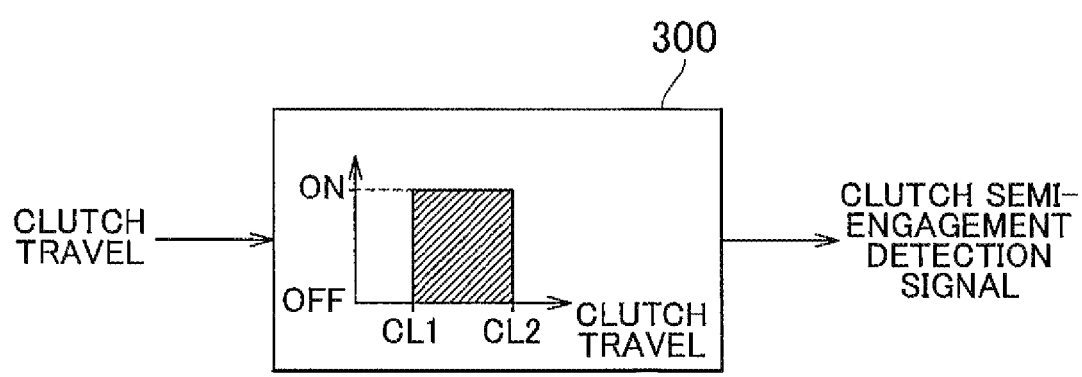
FIG. 4 is a graph illustrating the outline of the detection logic employed by a clutch semi-engagement detection section of the first example embodiment of the invention.

FIG. 4 is a graph illustrating the outline of the detection logic employed by the clutch semi-engagement detection section 300 of the first example embodiment.

Referring to FIG. 4, a map defining a clutch travel range in which the clutch device 2 can be determined to be in a semi-engaged state (CL1 to CL2) is stored in a memory portion 204. The clutch semi-engagement detection section 300 obtains the clutch travel detected by the clutch travel sensor 162 in each control cycle, and the clutch semi-engagement detection section 300 then determines whether the obtained clutch travel is within the range of CL1 to CL2. If the clutch travel is in the range of CL1 to CL2, the clutch semi-engagement detection section 300 determines that the clutch device 2 is presently in a semi-engaged state and outputs a clutch semi-engagement detection signal. The clutch travel range in which the clutch device 2 is determined to be in a semi-engaged state may be continuously updated through a particular learning process, for example.

Referring back to FIG. 3, the CSS monitor section 400 calculates a total intake air amount by accumulating the flow rate of air that is drawn into the engine 100 (airflow meter output GA) for a predetermined monitoring period from the start of the engine 100, and the CSS monitor section 400 determines whether the total intake air amount is smaller than a reference value. If the total intake air amount is smaller than the reference value, the CSS monitor section 400 determines the CSS control of the engine 100 as being abnormal.

The CSS monitor section 400 suspends the accumulation of the airflow rate (airflow meter output GA) when the clutch semi-engagement detection section 300 is detecting the clutch device 2 to be in a semi-engaged state. Typically, the driver places the clutch device 2 in a semi-engaged state when a large drive power is required, such as when starting the vehicle from a standstill. When the clutch device 2 is placed in a semi-engaged state, the load on the engine 100 largely varies and thus the friction (frictional resistance) of the engine 100 increases, causing an external disturbance to the combustion of the engine 100.

Figure 5:
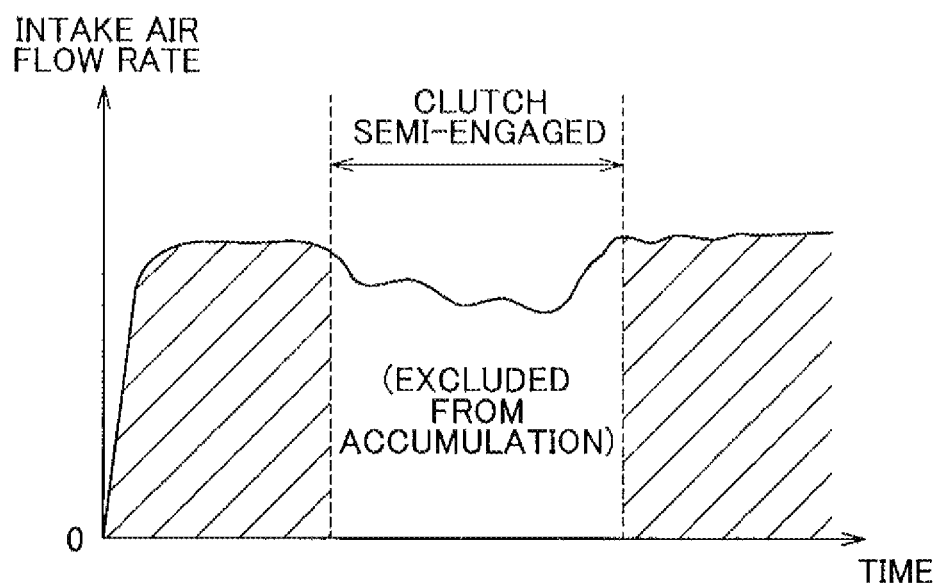
FIG. 5 is a graph illustrating an example of variation of the flow rate of air drawn into the engine.

FIG. 5 is a graph illustrating an example of variation of the flow rate of air drawn into the engine 100. Referring to FIG. 5, when the clutch device 2 has been placed in a semi-engaged state through a clutch pedal operation by the driver, the friction of the engine 100 increases and the flow rate of the air drawn into the engine 100 decreases. If whether the CSS control is abnormal is determined based on the total intake air amount including the airflow rate (airflow meter output GA) that was detected while the clutch device 2 was in the semi-engaged state, it may result in an erroneous determination. To cope with this, in this example embodiment, the intake airflow rate (airflow meter output GA) detected while the clutch device 2 is in a semi-engaged state is excluded from the calculation of the total intake air amount. More specifically, when the clutch device 2 is detected to be in a semi-engaged state, the accumulation for obtaining the total intake air amount is suspended, and the accumulation is continued until the total accumulation time excluding the time for which the accumulation was suspended becomes equal to the aforementioned monitoring period. Thus, in this case, the end of the accumulation is delayed by the time for which the clutch device 2 was detected to be in the semi-engaged state. As such, the monitoring of the CSS control of the engine 100 can be continued even if the driver is operating the clutch pedal.

CSS Monitor Section

Figure 6:
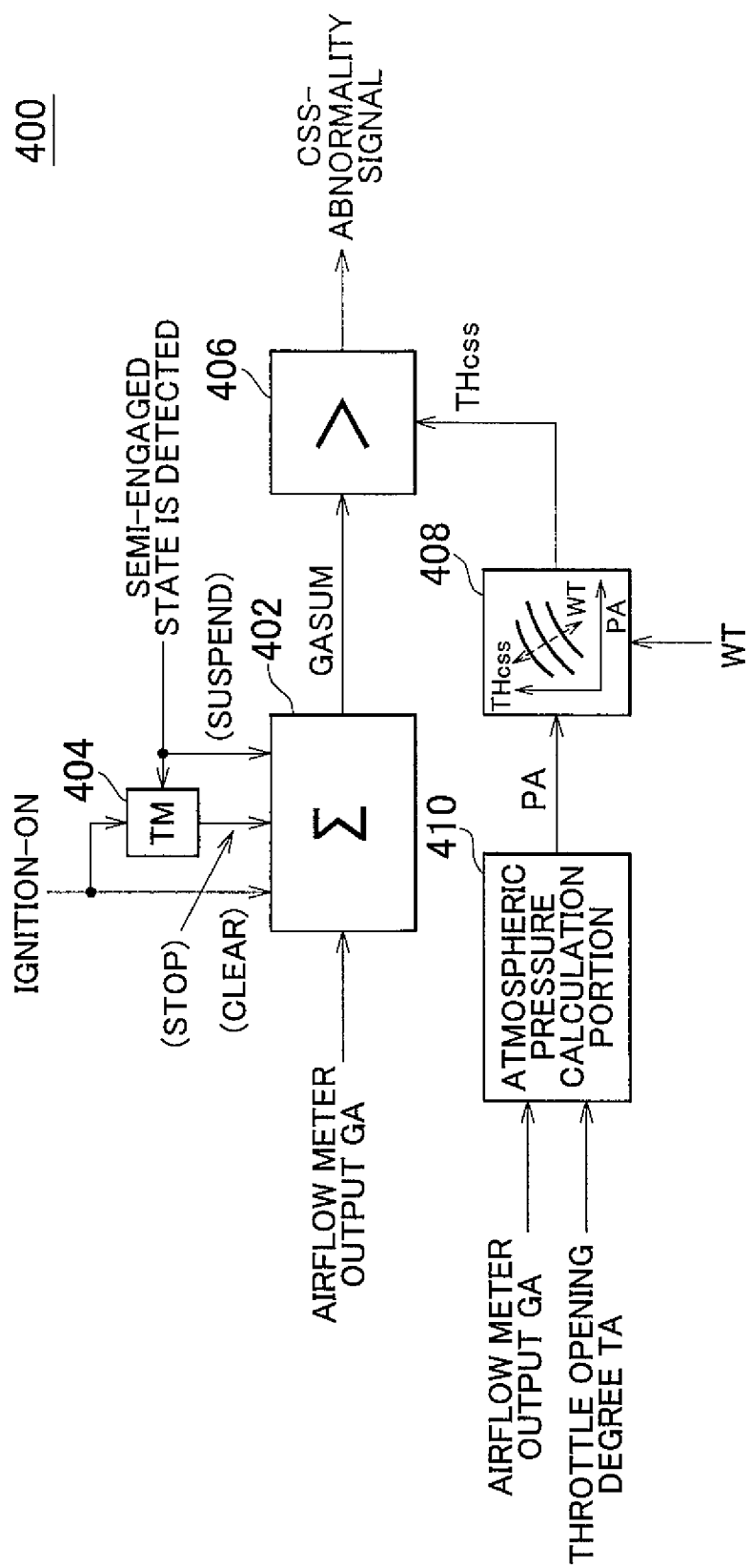
FIG. 6 is a block diagram illustrating the outline of the functional configuration of a CSS monitor section of the first example embodiment of the invention.

FIG. 6 is a block diagram illustrating the outline of the functional configuration of the CSS monitor section 400 of the first example embodiment.

Referring to FIG. 6, the CSS monitor section 400 includes an accumulating portion 402, a timer (TM) 404, a comparing portion 406, a reference value setting portion 408, an atmospheric pressure calculation portion 410.

The accumulating portion 402 and the timer 404 are used to calculate a total intake air amount GASUM by accumulating the flow rate (airflow meter output GA) of air drawn into the engine 100 for a predetermined monitoring period from the start of the engine 100. More specifically, in response to an ignition-ON signal being output from an ignition switch 142 (FIG. 2), the accumulating portion 402 clears the presently stored acculturated value and then starts accumulating the airflow meter output GA of the flow meter 126 (FIG. 2).

At this time, in response to the same ignition-ON signal, the timer 404 starts counting the monitoring period for which the accumulation of the airflow meter output GA is to be continued (e.g., 20 seconds). When the time count by the timer 404 has been finished, that is, when the monitoring period has passed from the time the ignition was turned on, the timer 404 outputs a stop signal to the accumulating portion 402. In response to this stop signal, the accumulating portion 402 stops the accumulation of the airflow meter output GA and then outputs the total intake air amount GASUM accumulated so far to the comparing portion 406.

Meanwhile, if the clutch semi-engagement detection section 300 is outputting the clutch semi-engagement signal to the accumulating portion 402 and the timer 404, the accumulating portion 402 suspends the accumulation of the airflow meter output GA and the timer 404 stops the time count. Thus, the airflow meter output GA detected while the clutch semi-engagement signal was being output from the clutch semi-engagement detection section 300 is excluded from the calculation of the total intake air amount GASUM.

Meanwhile, in order to ensure that the total intake air amount GASUM is calculated from the airflow meter output GA detected when the engine 100 is idling, the accumulation of the airflow meter output GA may be suspended also when the driver is racing the engine 100.

The comparing portion 406 is used to ascertain the presence of an abnormality of the CSS control based on the calculated total intake air amount GASUM. That is, the comparing portion 406 compares the total intake air amount GASUM calculated by the accumulating portion 402 and a reference value THcss obtained from the reference value setting portion 408. If the total intake air amount GASUM is smaller than the reference value THcss, the comparing portion 406 determines the CSS control as being abnormal and outputs the CSS-abnormality signal.

The reference value setting portion 408 and the atmospheric pressure calculation portion 410 are used to set the reference value THcss in each state. A map representing the characteristic of the reference value THcss defined in association with the atmospheric pressure value PA and the coolant temperature WT is stored in the memory portion 204, and the reference value setting portion 408 outputs, when receiving the ignition-ON signal, the reference value THcss corresponding to the present atmospheric pressure PA and the present coolant temperature WT to a selecting portion 412.

The atmospheric pressure calculation portion 410 calculates the atmospheric pressure based on the throttle opening degree TA obtained from the throttle sensor 128 (FIG. 2) and the airflow meter output GA obtained from the flow meter 126 (FIG. 2), rather than detecting it using an atmospheric pressure sensor. More specifically, when the engine 100 is normally operating, the flow rate of air drawn into the engine 100 (the airflow meter output GA) is decided based on given relations with the throttle opening degree TA and the atmospheric pressure. Thus, the ratio of the throttle opening degree TA to the airflow meter output GA (GA/TA) has a certain relation with the atmospheric pressure PA. Therefore, a map defining the relation between the ratio GA/TA and the atmospheric pressure PA, which is empirically formulated in advance, is stored in the memory portion 204, and the atmospheric pressure calculation portion 410 calculates the atmospheric pressure PA by referring to the map in each control cycle. Note that the atmospheric pressure calculation portion 410 may have a learning function and use it to increase the calculation accuracy of the atmospheric pressure PA.

Flowchart

In the following, the flow of the processes executed by the control apparatus 200 according to the functional configuration described above will be described.

Figure 7:
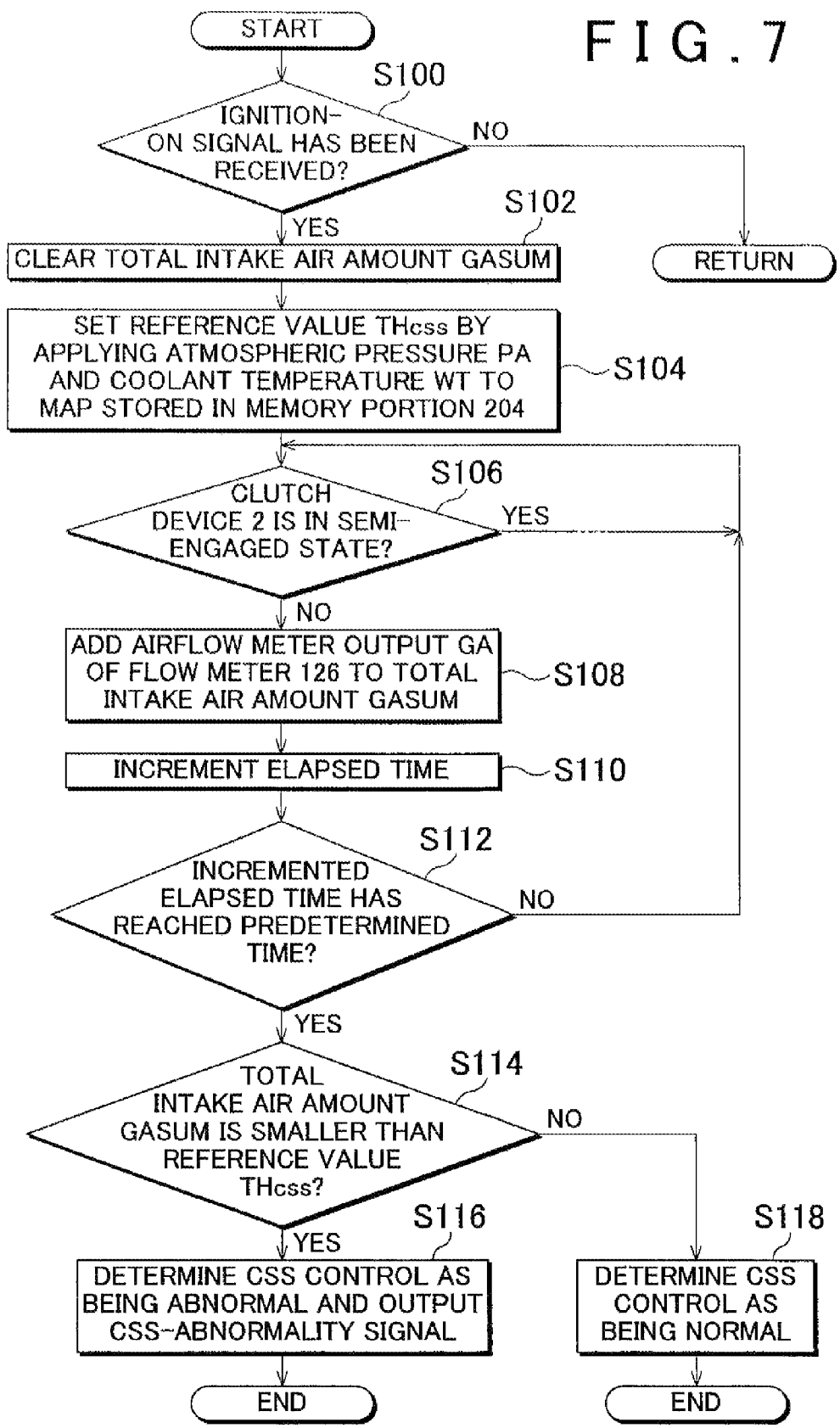
FIG. 7 is a flowchart illustrating the control routine executed by the CSS monitor section of the first example embodiment of the invention.

FIG. 7 is a flowchart illustrating the control routine executed by the CSS monitor section 400 of the first example embodiment. Note that the respective processes in this control routine are mainly executed by the CPU 202 of the control apparatus 200.

Referring to FIG. 7, the CPU 202 determines whether the ignition-ON signal has been received (step S100). If the ignition-ON signal has not been received (step S100: NO), the CPU 202 returns to the beginning of the control routine and starts it again. That is, the CPU 202 executes the process in step S102 and its subsequent steps on the condition that the ignition-ON signal has been received.

If it is determined that the ignition-ON signal has been received (step S100: YES), the CPU 202 clears the total intake air amount GASUM (step S102) and sets the reference value THcss by applying the present atmospheric pressure PA and the present coolant temperature WT to the map stored in the memory portion 204 (step S104).

Then, the CPU 202 determines whether the clutch device 2 is presently in a semi-engaged state (step S106). If the clutch device 2 is presently in a semi-engaged state (step S106: YES), the CPU 202 repeats the process of step S106 until the clutch device 2 is released from the semi-engaged state.

On the other hand, if the clutch device 2 is not presently in a semi-engaged state (step S106: NO), the CPU 202 adds the airflow meter output GA of the flow meter 126 to the total intake air amount GASUM (step S108) and increments an elapsed time (step S110). Note that the elapsed time represents the time for which the accumulation for obtaining the total intake air amount GASUM has been continued (i.e., the total time excluding the time for which the accumulation was suspended) and it is incremented by a value corresponding to the length of each control cycle.

Then, the CPU 202 determines whether the incremented elapsed time has reached a predetermined time (step S112). If the incremented elapsed time has not yet reached the predetermined time (step S112: NO), the CPU 202 executes the process in step S106 onward again.

On the other hand, if the elapsed time has already reached the predetermined time (step S112: YES), the CPU 202 then determines whether the total intake air amount GASUM accumulated so far is smaller than the reference value THcss (step S114). If the total intake air amount GASUM is smaller than the reference value THcss (step S114: YES), the CPU 202 determines the CSS control as being abnormal and then outputs the CSS-abnormality signal (step S116), after which the CPU 202 finishes the control routine.

On the other hand, if the total intake air amount GASUM is not smaller than the reference value THcss (step S114: NO), the CPU 202 determines the CSS control as being normal (step S118) and finishes the control routine without outputting the CSS-abnormality signal.

The elements of the first example embodiment correspond to those of the invention as follows: the CSS monitor section 400 corresponds to "monitoring portion", the accumulating portion 402 and the timer 404 correspond to "total air amount calculation portion", the comparing portion 406 corresponds to "abnormality determination portion", and the clutch semi-engagement detection section 300 corresponds to "detecting portion".

According to the first example embodiment, as described above, when the total intake air amount calculated by accumulating the flow rate of air drawn into the engine is smaller than the reference value, the CSS control is determined as being abnormal. Further, the accumulation of the flow rate of air drawn into the engine is suspended as long as the clutch device is detected to be in a semi-engaged state, and thus the flow rate of air drawn into the engine while the clutch device is in the semi-engaged state is excluded from the calculation of the total intake air amount.

Thus, the monitoring of the CSS control of the engine can be performed in a reliable manner without making an erroneous determination even if the driver is operating the clutch pedal.

Second Example Embodiment

While the airflow rate (the airflow meter output GA) detected while the clutch device is in a semi-engaged state is excluded from the calculation of the total intake air amount in the first example embodiment described above, when the clutch device is in a semi-engaged state, the aforementioned reference value for the CSS control abnormality determination may be changed to a value corresponding to a semi-engaged state of the clutch device. Thus, the second example embodiment employs a structure in which the reference value for the CSS control abnormality determination is changed when the clutch device is detected to be in a semi-engaged state.

A vehicle 1A monitored by a monitoring apparatus of the second example embodiment of the invention is substantially identical to the vehicle 1 shown in FIG. 1 and therefore it will not be described in detail again. Further, the vehicle 1A incorporating the monitoring apparatus of the second example embodiment is identical to the vehicle 1 shown in FIG. 2 except that the functional configuration of the control apparatus 200A is different from that of the control apparatus 200, and therefore it will not be described in detail again. Further, the functional configuration of the control apparatus 200A of the second example embodiment is identical to that of the control apparatus 200 of the first example embodiment shown in FIG. 3 except that a CSS monitor section 400A is provided in place of the CSS monitor section 400. The clutch semi-engagement detection section 300 of the second example embodiment is identical to that of the first example embodiment, and therefore it will not be described in detail again.

Figure 8:
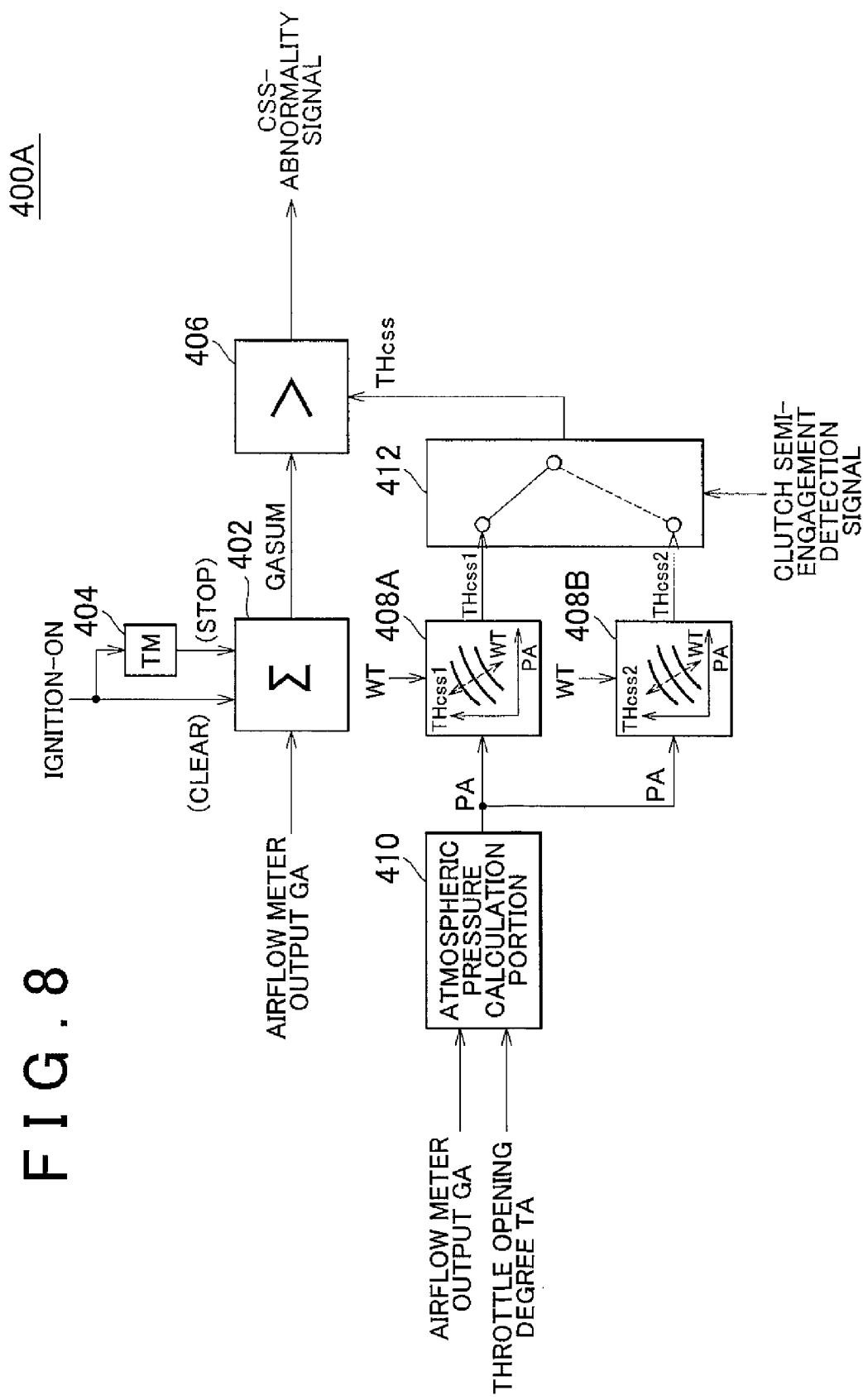
FIG. 8 is a block diagram illustrating the outline of the functional configuration of a CSS monitor section of the second example embodiment of the invention.

FIG. 8 is a block diagram illustrating the outline of the functional configuration of the CSS monitor section 400A of the second example embodiment.

Referring to FIG. 8, the functional configuration of the CSS monitor section 400A is substantially identical to that of the CSS monitor section 400 shown in FIG. 6 except that a first reference value setting portion 408A, a second reference value setting portion 408B, and a selecting portion 412 are provided in place of the reference value setting portion 408.

The first reference value setting portion 408A is used to set the reference value THcss when the clutch device 2 is not in a semi-engaged state, and the second reference value setting portion 408B is used to set the reference value THcss when the clutch device 2 is in a semi-engaged state.

Maps representing the characteristics of reference values THcss1 and THcss2 defined in association with the atmospheric pressure PA and the coolant temperature WT are stored in the memory portion 204. When receiving the ignition-ON signal, the first reference value setting portion 408A and the second reference value setting portion 408B output the reference values THcss1 and THcss2, both corresponding to the present atmospheric pressure PA and the present coolant temperature WT, to the selecting portion 412, respectively.

The reference value THcss2 set by the second reference value setting portion 408B in accordance with the atmospheric pressure PA and the coolant temperature WT is smaller than the reference value THcss 1 set by the first reference value setting portion 408A in accordance with the same atmospheric pressure PA and coolant temperature WT. That is, when the clutch device 2 is in a semi-engaged state, the flow rate of air drawn into the engine 100 decreases as described earlier with reference to FIG. 8, and therefore the reference value THcss2 is set to a relatively small value. Note that the characteristics of the references values THcss1 and THcss2 are empirically obtained in advance.

The selecting portion 412 selects one of the reference value THcss1 output from the first reference value setting portion 408A and the reference value THcss2 output from the second reference value setting portion 408B based on whether the clutch semi-engagement detection signal is being output and then outputs the selected reference value to the comparing portion 406. That is, the selecting portion 412 outputs the reference value THcss2 obtained from the second reference value setting portion 408B to the comparing portion 406 when the clutch semi-engagement detection section 300 is detecting the clutch device 2 to be in a semi-engaged state, and otherwise the selecting portion 412 outputs the reference value THcss1 obtained from the first reference value setting portion 408A to the comparing portion 406.

As such, when the clutch device 2 is detected to have been placed in a semi-engaged state, the reference value THcss for the CSS control abnormality determination is set to a smaller value to compensate for the resultant decrease in the flow rate of air drawn into the engine 100 (the airflow meter output GA), and therefore the abnormality monitoring for the CSS control can be continued without making an erroneous determination.

Other portions of the CSS monitor section 400A are identical to those of the CSS monitor section 400 of the first example embodiment, and therefore they will not be described in detail again.

In the following, the flow of the processes executed by the control apparatus 200A according to the functional configuration described above will be described.

Figure 9A:
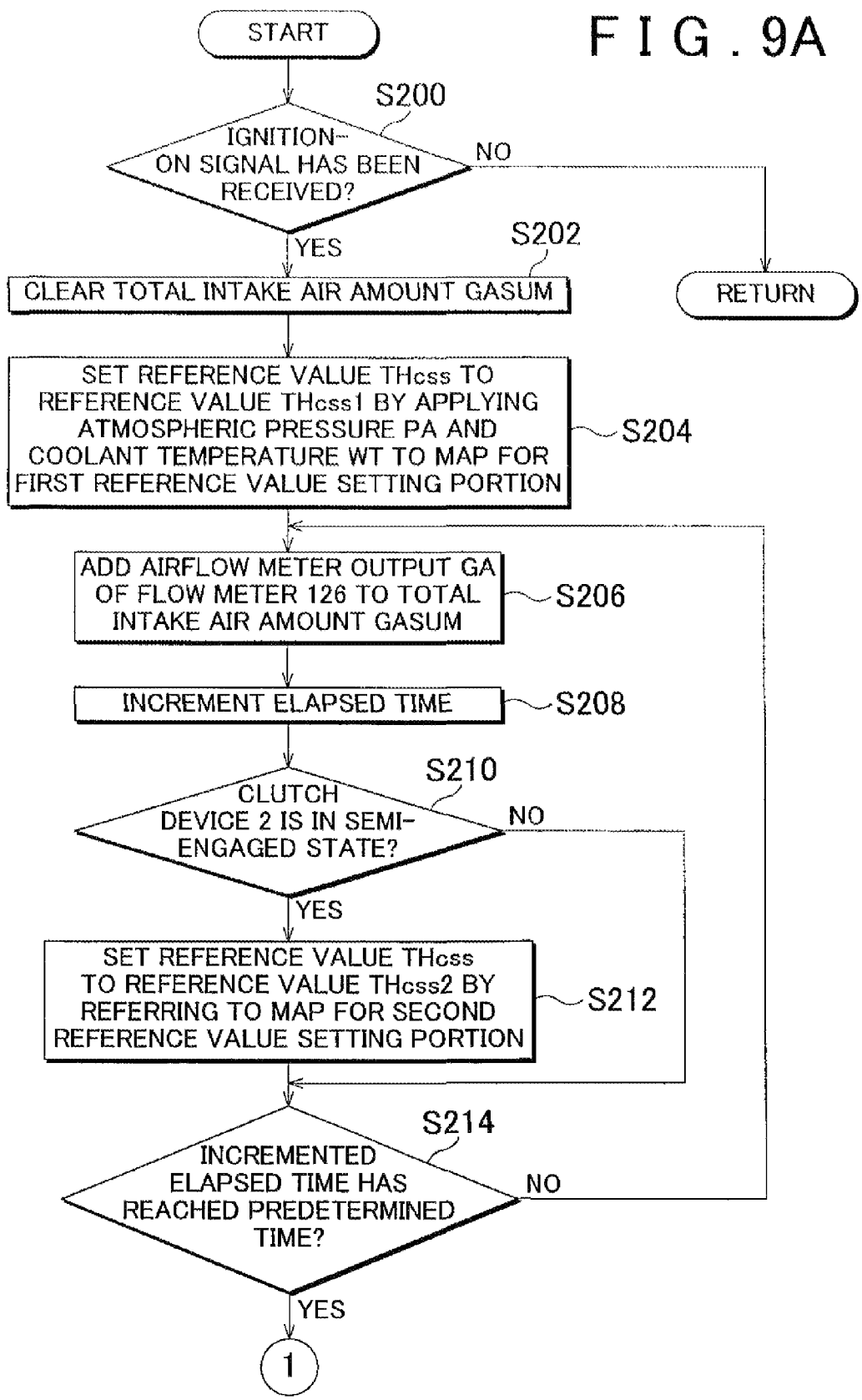
FIG. 9A and FIG. 9B are flowcharts illustrating the control routine executed by the CSS monitor section of the second example embodiment of the invention.
Figure 9B:
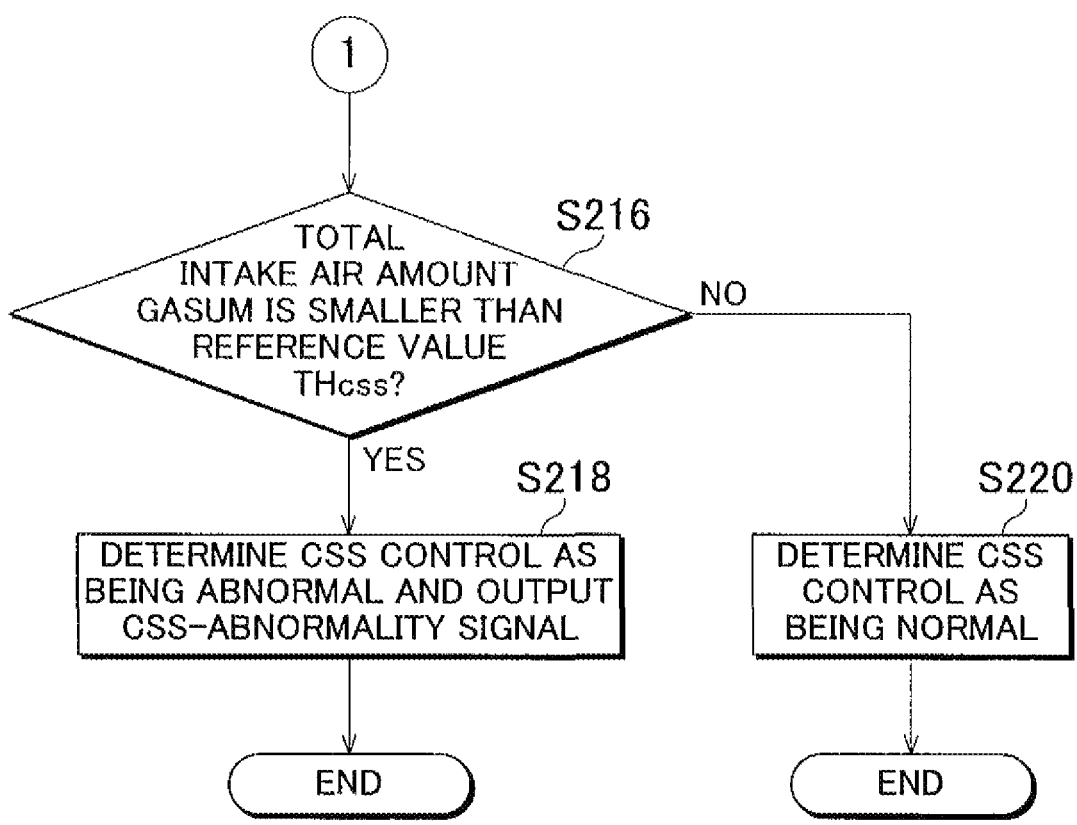

FIG. 9A and FIG. 9B are flowcharts illustrating the control routine executed by the CSS monitor section 400A of the second example embodiment. Note that the respective processes in this control routine are mainly executed by the CPU 202 of the control apparatus 200A.

Referring to FIG. 9A and FIG. 9B, the CPU 202 determines whether the ignition-ON signal has been received (step S200). If the ignition-ON signal has not been received (step S200: NO), the CPU 202 returns to the beginning of the control routine and starts it again. That is, the CPU 202 executes the processes in step S202 and its subsequent steps on the condition that the ignition-ON signal has been received.

If it is determined that the ignition-ON signal has been received (step S200: YES), the CPU 202 clears the total intake air amount GASUM (step S202) and sets the reference value THcss by applying the present atmospheric pressure PA and the present coolant temperature WT to a map for the first reference value setting portion 408A (FIG. 8), which is stored in the memory portion 204 (step S204).

Then, the CPU 202 adds the airflow meter output GA of the flow meter 126 to the total intake air amount GASUM (step S206) and increments an elapsed time (step S208). Note that the elapsed time represents the time for which the accumulation for obtaining the total intake air amount GASUM has been continued and it is incremented by a value corresponding to the length of each control cycle.

Then, the CPU 202 determines whether the clutch device 2 is presently in a semi-engaged state (step S210). If the clutch device 2 is presently in a semi-engaged state (step S210: YES), the CPU 202 then sets the reference value THcss to the reference value THcss2 by referring to a map for the second reference value, setting portion 408B (FIG. 8), which is stored in the memory portion 204 (step S212).

On the other hand, if it is determined that the clutch device 2 is not presently in a semi-engaged state (step S210: NO), or after step S212 has been executed, the CPU 202 then determines whether the incremented elapsed time has reached a predetermined time (step S214). If the elapsed time has not yet reached the predetermined time (step S214: NO), the CPU 202 then executes the process in step S206 onward again.

On the other hand, if the elapsed time has already reached the predetermined time (step S214; YES), the CPU 202 then determines whether the total intake air amount GASUM accumulated so far is smaller than the reference value THcss (step S216). If the total intake air amount GASUM is smaller than the reference value THcss (step S216: YES), the CPU 202 determines the CSS control as being abnormal and then outputs the CSS-abnormality signal (step S218), after which the CPU 202 finishes the control routine.

On the other hand, if the total intake air amount GASUM is not smaller than the reference value THcss (step S216: NO), the CPU 202 determines the CSS control as being normal (step S220) and finishes the control routine without outputting the CSS-abnormality signal.

The elements of the second example embodiment correspond to those of the invention as follows: the CSS monitor section 400A corresponds to "monitoring portion", the accumulating portion 402 and the timer 404 correspond to "total air amount calculation portion", the comparing portion 406 corresponds to "abnormality determination portion", and the clutch semi-engagement detection section 300 corresponds to "detecting portion".

According to the second example embodiment, as described above, when the total intake air amount calculated by accumulating the flow rate of air drawn into the engine is smaller than the reference value, the CSS control for the engine is determined as being abnormal, and when the clutch device is detected to be in a semi-engaged state, the reference value is changed to a smaller value, that is, the reference value is reduced as the flow rate of air drawn into the engine decreases as a result of the clutch device having been placed in the semi-engaged state.

Thus, the monitoring of the CSS control for the engine can be performed in a reliable manner without making an erroneous determination even if the driver is operating the clutch pedal.

Third Example Embodiment

In the first and second example embodiments, as described above, the presence of an abnormality of the CSS control is ascertained based on the total amount of air that has been drawn into the engine 100 for the monitoring period. In the third example embodiment, on the other hand, the presence of an abnormality of the CSS control is ascertained based on the ignition timing of the ignition plugs 110. Note that a vehicle may either incorporate both the structure of the first and second example embodiments and the structure of the third example embodiment or incorporate only one of them.

A vehicle 1B monitored by a monitoring apparatus of the third example embodiment of the invention is substantially identical to the vehicle 1 shown in FIG. 1 and therefore it will not be described in detail again. Further, the vehicle 1B incorporating the monitoring apparatus of the third example embodiment is identical to the vehicle 1 shown in FIG. 2 except that the functional configuration of the control apparatus 200B is different from that of the control apparatus 200, and therefore it will not be described in detail again. Further, the functional configuration of the control apparatus 200B of the third example embodiment is identical to that of the control apparatus 200 of the first example embodiment shown in FIG. 3 except that a CSS monitor section 400B is provided in place of the CSS monitor section 400. Because the clutch semi-engagement detection section 300 of the third example embodiment is identical to that of the first example embodiment, it will not be described in detail again.

The control apparatus 200B of the third example embodiment retards, as part of the CSS control, the ignition timing of the ignition plugs 110 in order to accelerate the warning-up of the three-way catalyst 112.

Figure 10:
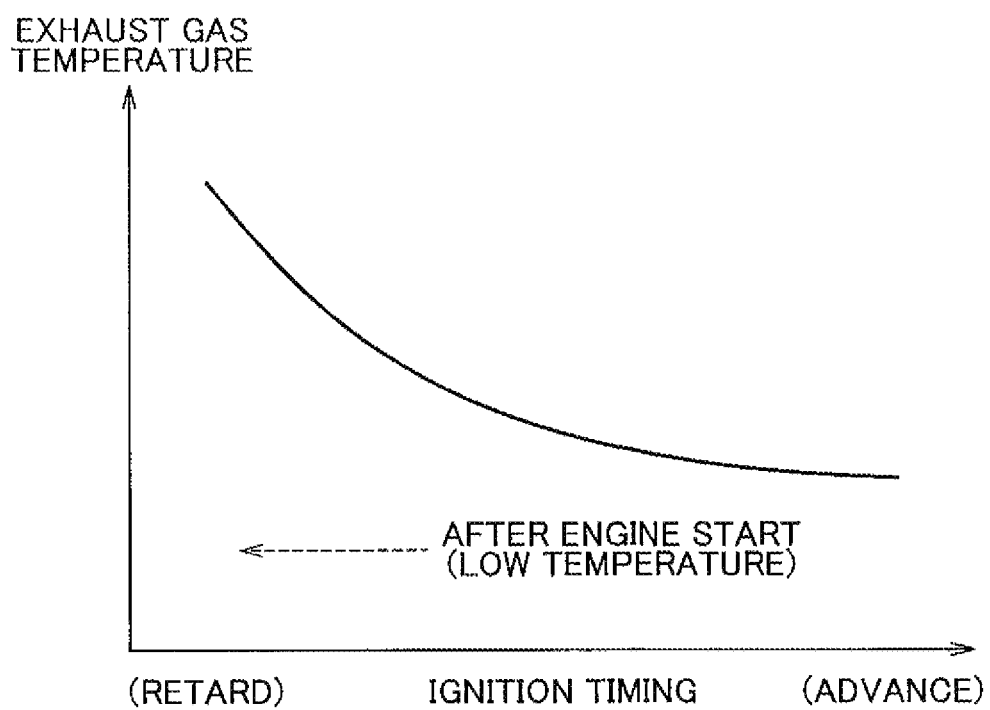
FIG. 10 is a graph illustrating the relation between the ignition timing of the ignition plugs and the temperature of exhaust gas.

FIG. 10 is a graph illustrating the relation between the ignition timing of the ignition plugs and the exhaust gas temperature. As is shown in FIG. 10, the exhaust gas temperature increases as the ignition timing of the ignition plugs 110 is retarded. That is, when the ignition timing is retarded, the combustion of an air-fuel mixture starts after the piston 114 has passed the top dead center, and in this case, the expansive force obtained from the combustion is not adequately converted into work (torque). Thus, a relatively large amount of thermal energy fails to be converted into work and it remains in exhaust gas, resulting in an increase in the exhaust gas temperature.

To take advantage of this characteristic, when the temperature of the engine 100 is low, the control apparatus 200B retards the ignition timing of the ignition plugs 110 and thus increases the exhaust gas temperature to accelerate the warming-up of the three-way catalyst 112.

Thus, if such retarding of the ignition timing has failed to be performed for some reason, it indicates that the CSS control is abnormal. Thus, in this example embodiment, the control apparatus 200B ascertains the presence of an abnormality of the CSS control based on the ignition timing of the ignition plugs 110. Note that this process is executed by the CSS monitor section 400B.

More specifically, the CSS monitor section 400B determines the CSS control as being abnormal when the ignition timing of the ignition plugs 110 has remained in an advanced side for a predetermined determination time (e.g., 5 seconds) during a monitoring period after the start of the engine 100 (e.g., a time period of 10 seconds starting 3 to 13 seconds after the engine start).

The ignition timing of the ignition plugs 110 is changed according to the speed of the engine 100, and therefore, preferably, the ignition timing of the ignition plugs 110 should not be monitored when the clutch device is in a semi-engaged state. As such, in this example embodiment, when the clutch device is detected to be in a semi-engaged state, the monitoring on the ignition timing is suspended to avoid making an erroneous determination.

Figure 11:
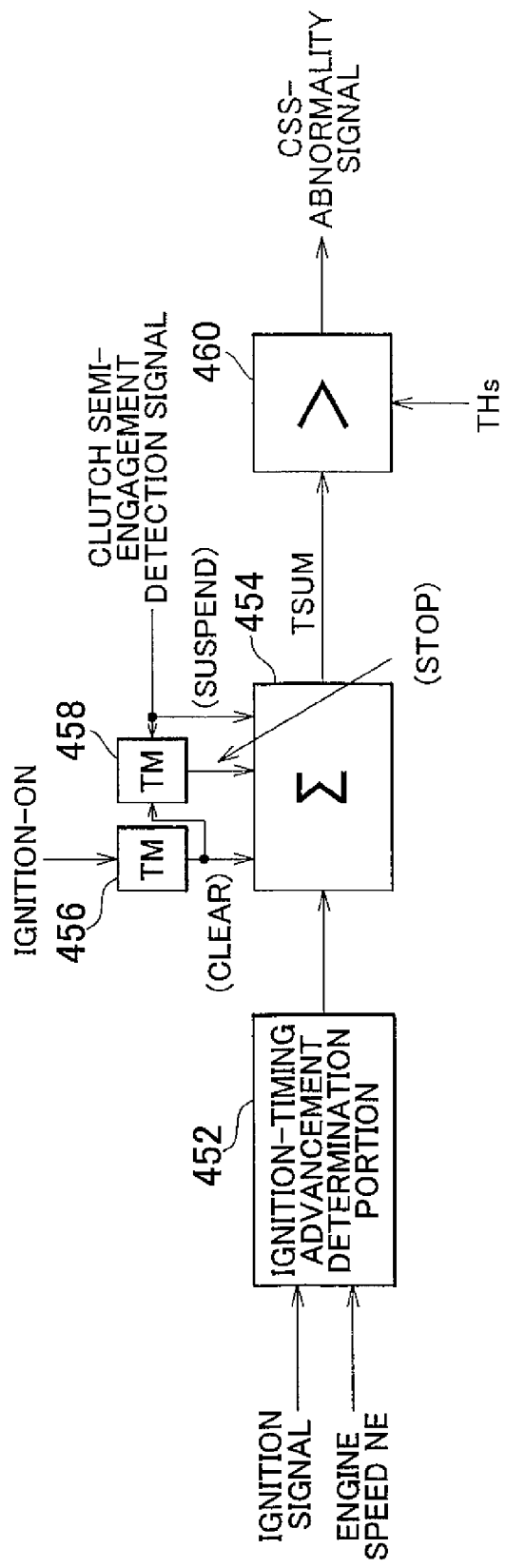
FIG. 11 is a block diagram illustrating the outline of the functional configuration of a CSS monitor section of the third example embodiment.

FIG. 11 is a block diagram illustrating the outline of the functional configuration of the CSS monitor section 400B of the third example embodiment.

Referring to FIG. 11, the CSS monitor section 400B has an ignition-timing advancement determination portion 452, a time counting portion 454, a timer (TM) 456, a timer (TM) 458, and a comparing portion 460.

In general, the ignition timing of an ignition plug is defined with respect to the top dead center and indicated with "AFDC (After Top Dead Center)" and "BTDC (Before Top Dead Center)". Thus, "the ignition timing is in the advanced side" refers to a case where the ignition timing is before the top dead center. The ignition-timing advancement determination portion 452 determines whether the ignition timing of the ignition plugs 110 is in the advanced side. More specifically, the ignition-timing advancement determination portion 452 compares the ignition signal output to each ignition plug 110 with the engine speed NE detected by the crank sensor 140 (FIG. 2) and identifies the present ignition timing of the ignition plug 110 based on the angular difference from the top dead center.

Then, when the ignition timing (angle) is at or earlier than a predetermined point (e.g., 0° ATDC), the ignition-timing advancement determination portion 452 determines that the ignition timing of the ignition plugs 110 is in the advanced side and then notifies the time counting portion 454 so.

The time counting portion 454 and the timers 456, 458 are used to count the time the ignition timing of the ignition plugs 110 remains in the advanced side during the monitoring period after the start of the engine 100.

The timer 456 commands the time counting portion 454 to start the time count. For example, the timer 456 outputs a reset signal to the time counting portion 454 a predetermined time (e.g., 3 seconds) after the ignition-ON signal is output. The timer 458 is used to command the time counting portion 454 to stop the time count. The timer 458 outputs a stop signal to the time counting portion 454 a predetermined time (e.g., 10 seconds) after the reset signal is output from the timer 456. Further, the timer 458 suspends the time count in the presence of the clutch semi-engagement detection signal from the clutch semi-engagement detection section 300. As such, the counting of the monitoring period stops when the clutch semi-engagement detection section 300 detects that the clutch device 2 is in a semi-engaged state.

Meanwhile, when receiving the reset signal from the timer 456, the time counting portion 454 clears a continuation time TSUM, which has been previously counted and stored, and starts counting the continuation time TSUM. The continuation time TSUM represents the time for which the ignition-timing advancement notification from the ignition-timing advancement determination portion 452 continues. When receiving the stop signal from the timer 458, the time counting portion 454 stops the counting of the continuation time TSUM. Further, when receiving the clutch semi-engagement detection signal, the time counting portion 454 suspends the counting of the continuation time TSUM.

As such, the time for which the clutch device has been detected to be in a semi-engaged state by the clutch semi-engagement detection section 300 is excluded from the continuation time TSUM.

Further, the continuation time TSUM counted by the time counting portion 454 is given to the comparing portion 460 and then compared with a predetermined reference value THs. If the continuation time TSUM is longer than the reference value THs (e.g., 5 seconds), that is, when the ignition timing of the ignition plugs 110 has remained in the advanced side longer than the reference value THs, the CSS-abnormality signal is output.

Flowchart

In the following, the flow of the processes executed by the control apparatus 200B according to the functional configuration described above will be described.

Figure 12A:
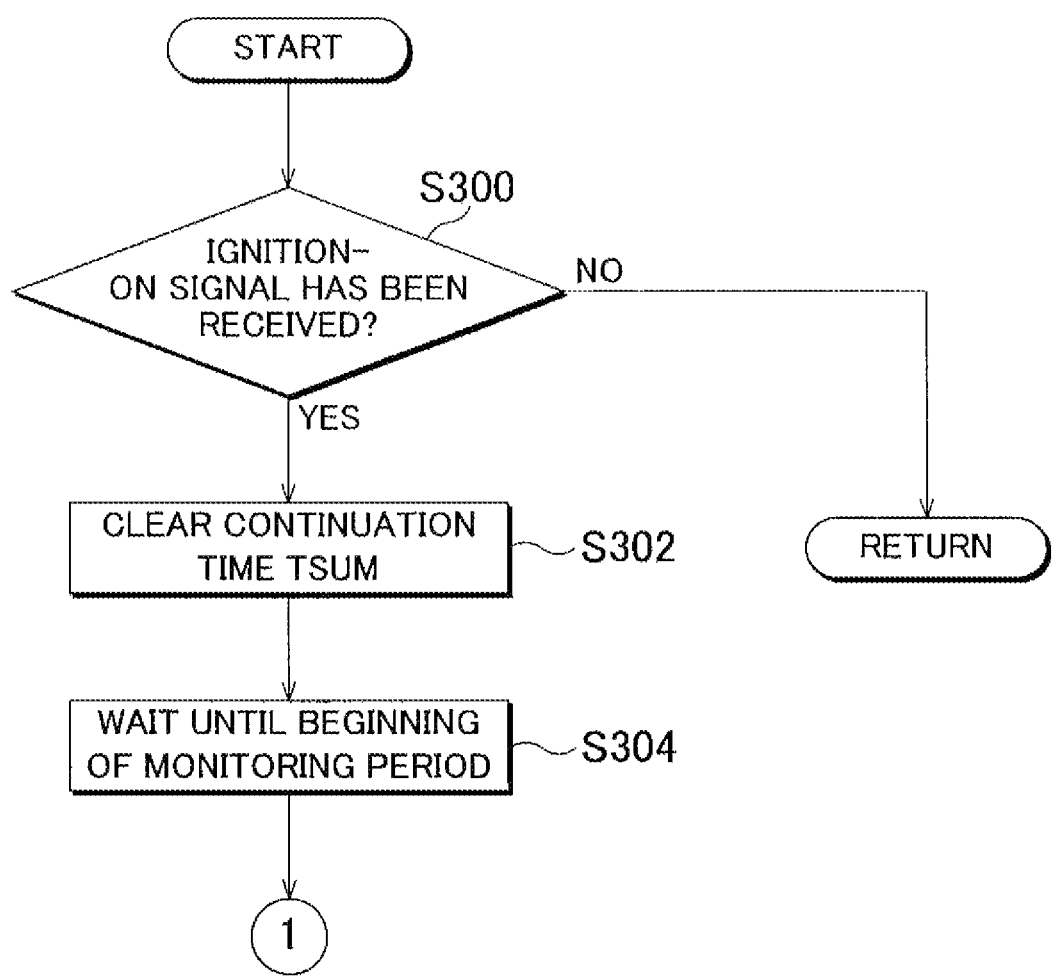
FIG. 12A and FIG. 12B are flowcharts illustrating the control routine executed by the CSS monitor section of the third example embodiment of the invention.
Figure 12B:
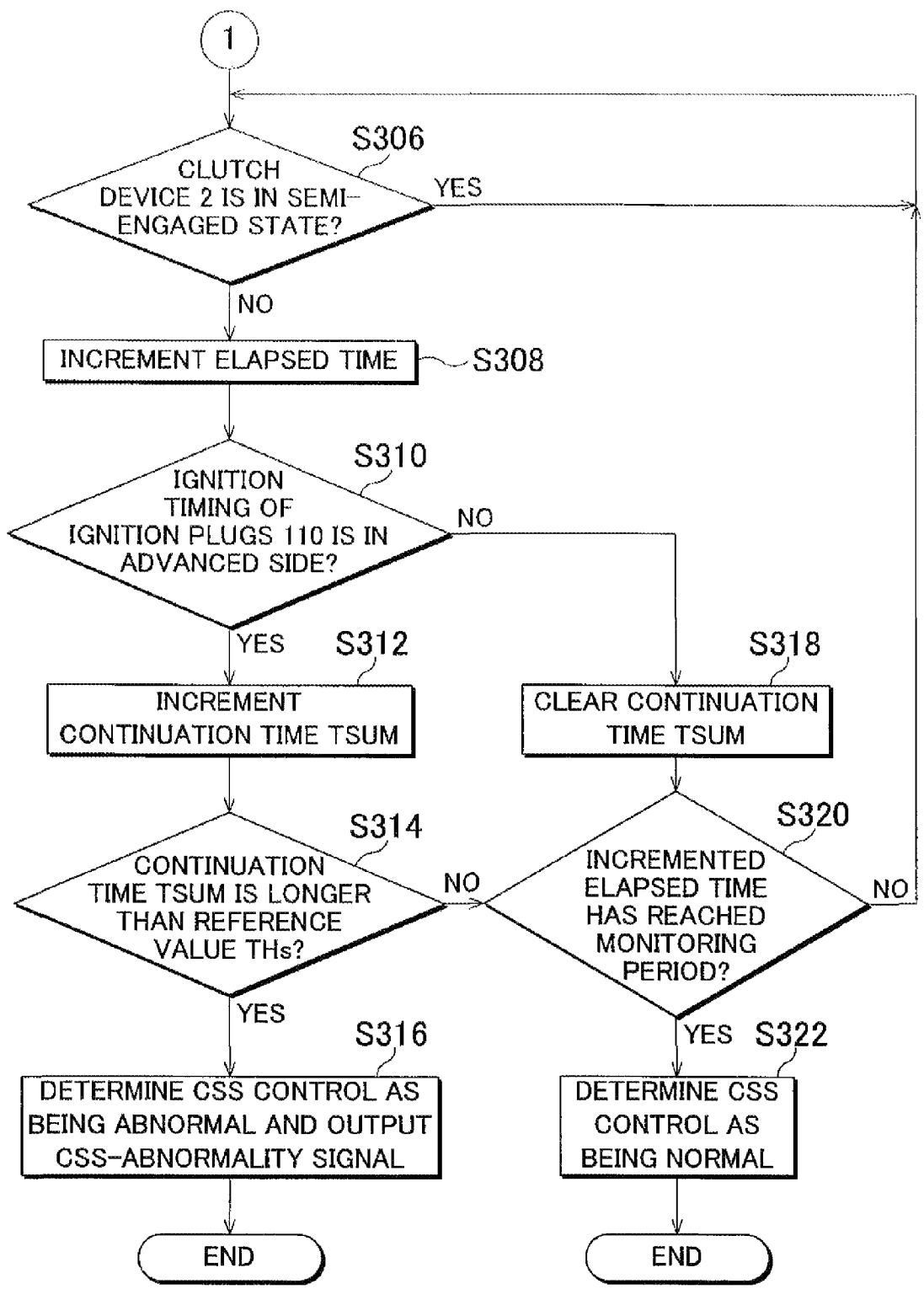

FIG. 12A and FIG. 12B are flowcharts illustrating the control routine executed by the CSS monitor section 400B of the third example embodiment. Note that the respective processes in this control routine are mainly executed by the CPU 202 of the control apparatus 200B.

Referring to FIG. 12A and FIG. 12B, the CPU 202 determines whether the ignition-ON signal has been received (step S300). If the ignition-ON signal has not been received (step S300: NO), the CPU 202 returns to the beginning of the control routine and starts it again. That is, the CPU 202 executes the process in step S302 and its subsequent steps on the condition that the ignition-ON signal has been received.

If it is determined that the ignition-ON signal has been received (step S300: YES), the CPU 202 clears the continuation time TSUM (step S302) and waits until the beginning of the monitoring period (step S304).

After the beginning of the monitoring period, the CPU 202 determines whether the clutch device 2 is presently in a semi-engaged state (step S306). If the clutch device 2 is presently in a semi-engaged state (step S306: YES), the CPU 202 waits until the clutch device 2 is released from the semi-engaged state (step S306).

On the other hand, if the clutch device 2 is not in a semi-engaged state (step S306: NO), the CPU 202 increments an elapsed time (step S308). The elapsed time represents the time for which the ignition timing of the ignition plugs 110 has been monitored and it is incremented by a value corresponding to the length of each control cycle.

Subsequently, the CPU 202 determines whether the ignition timing of the ignition plugs 110 is presently in the advanced side (step S310). If the ignition timing of the ignition plugs 110 is presently in the advanced side (step S310: YES), the CPU 202 then increments the continuation time TSUM (step S312). Then, the CPU 202 determines whether the incremented continuation time TSUM is longer than the reference value THs (step S314). If the continuation time TSUM is longer than the reference value THs (step S314: YES), the CPU 202 determines the CSS control as being abnormal and then outputs the CSS-abnormality signal (step S316), after which the CPU 202 finishes the control routine.

On the other hand, if the ignition timing of the ignition plugs 110 is not presently in the advanced side (step S310: NO), the CPU 202 clears the continuation time TSUM (step S318).

If it is determined that the continuation time TSUM is not longer than the reference value THs (step S314: NO) or after the continuation time TSUM is cleared (step S318), the CPU 202 determines whether the incremented elapsed time has reached the monitoring period (step S320). If the incremented elapsed time has not yet reached the monitoring period (step S320: NO), the CPU 202 executes the processes of step S306 onward again.

On the other hand, when it is determined that the incremented elapsed time has reached the monitoring period (step S320: YES), the CPU 202 determines the CSS control as being normal (step S322) and finishes the control routine without outputting the CSS-abnormality signal.

According to the third example embodiment, described above, when the ignition timing of the ignition plugs has remained in the advanced side longer than the reference value, the CSS control is determined as being abnormal. Further, when the clutch device is detected to be in a semi-engaged state, the counting of the time for which the ignition timing has remained in the advanced side is suspended. As such, the presence of an abnormality of the CSS control can be properly ascertained without being influenced by a change of the ignition timing of the ignition plugs 110 resulting from the clutch device having been placed in a semi-engaged state.

Thus, the monitoring of the CSS control for the engine can be performed in a reliable manner without making an erroneous determination even if the driver is operating the clutch pedal.

The elements of the third example embodiment correspond to those of the invention as follows: the CSS monitor section 400B corresponds to "monitoring portion", the accumulating portion 454 and the timers 456, 458 correspond to "total air amount calculation portion", the comparing portion 406 corresponds to "abnormality determination portion", and the clutch semi-engagement detection section 300 corresponds to "detecting portion".

It is to be understood that the invention is not limited to the example embodiments described above. To the contrary, the invention is intended to cover all possible modifications and equivalent arrangements within the scope of the invention as described in the claims without any limitations based on the example embodiments.

What is claimed is:

1. A monitoring apparatus for monitoring an operation state of an internal combustion engine of a vehicle having a frictional coupling device that allows or interrupts transmission of drive power from the internal combustion engine to drive wheels of the vehicle, the frictional coupling device being adapted to change the amount of engagement as the frictional coupling device is operated by a driver, wherein the internal combustion engine includes an igniter provided in a combustion chamber and used to ignite fuel in the combustion chamber, the monitoring apparatus comprising:

a processor including executable programmed logic, for performing:

monitoring a state value indicating the operation state of the internal combustion engine for a predetermined monitoring period;

detecting a semi-engaged state of the frictional coupling device; and suspending the monitoring when the semi-engaged state of the frictional coupling device is detected, and continuing the monitoring until a total monitoring time excluding the time during which the monitoring is suspended becomes equal to the predetermined monitoring period, determining whether the ignition timing of the igniter is in an advanced side;

counting the time for which the ignition timing remains in the advanced side; and determining the operation state of the internal combustion engine as being abnormal when the counted time has exceeded a reference value, wherein the suspension of the monitoring is accomplished by suspending the time count.

2. The monitoring apparatus according to claim 1, wherein the processor further performs calculating a total air amount by accumulating the flow rate of air drawn into the internal combustion engine for the predetermined monitoring period; and determining the operation state of the internal combustion engine as being abnormal when the calculated total air amount is smaller than a reference value, and spending the flow rate accumulation to accomplish the suspension of the monitoring.

3. The monitoring apparatus according to claim 2, wherein the reference value is set according to at least one of the atmospheric pressure and the temperature of coolant of the internal combustion engine.

4. The monitoring apparatus according to claim 2, wherein the flow rate accumulation is suspended when the internal combustion engine is being raced.

5. The monitoring apparatus according to claim 1, wherein the monitoring starts in response to a start of the internal combustion engine.

6. The monitoring apparatus according to claim 1, wherein the internal combustion engine runs by combusting gasoline.

7. The monitoring apparatus according to claim 1, wherein the vehicle has an operation mechanism having a movable portion that is driven to change the amount of engagement of the frictional coupling device, and the semi-engaged state of the frictional coupling device is detected based on the travel of the movable portion of the operation mechanism.

8. A method for monitoring an operation state of an internal combustion engine of a vehicle having a frictional coupling device that allows or interrupts transmission of drive power from the internal combustion engine to drive wheels of the vehicle, the frictional coupling device being adapted to change the amount of engagement as the frictional coupling device is operated by a driver, the method using a processor in performing the steps of:

monitoring a state value indicating the operation state of the internal combustion engine for a predetermined monitoring period and storing the state value in a memory;

detecting a semi-engaged state of the frictional coupling device; and suspending the monitoring while the semi-engaged state of the frictional coupling device is being detected and resuming the monitoring then the semi-engaged state of the frictional coupling device is no longer being detected until a total monitoring time excluding the time during which the monitoring is suspended becomes equal to the predetermined monitoring period, wherein the internal combustion engine includes an igniter provided in a combustion chamber and used to ignite fuel in the combustion chamber, the method further comprising:

determining whether the ignition timing of the igniter is in an advanced side;

counting the time for which the ignition timing remains in the advanced side; and determining the operation state of the internal combustion engine as being abnormal when the counted time has exceeded a reference value, wherein the suspension of the monitoring is accomplished by suspending the time count.

9. The method according to claim 8, wherein the monitoring on the state value includes: calculating a total air amount by accumulating the flow rate of air drawn into the internal combustion engine for the predetermined monitoring period; and determining the operation state of the internal combustion engine as being abnormal when the calculated total air amount is smaller than a reference value, wherein the suspension of the monitoring is accomplished by suspending the flow rate accumulation.

10. The method according to claim 8, wherein the reference value is set according to at least one of the atmospheric pressure and the temperature of coolant of the internal combustion engine.

11. The method according to claim 8, wherein the flow rate accumulation is suspended when the internal combustion engine is being raced.

12. The method according to claim 8, wherein the monitoring is started in response to a start of the internal combustion engine.

13. The method according to claim 8, wherein the internal combustion engine runs by combusting gasoline.

14. The method according to claim 8, wherein the vehicle has an operation mechanism having a movable portion that is driven to change the amount of engagement of the frictional coupling device, and the semi-engaged state of the frictional coupling device is detected based on the travel of the movable portion of the operation mechanism.

* * * * *